United States Patent

[11] 3,572,629

[72] Inventor Edward Coe Clark
  5602 Hawthorne St., Cheverly, Md. 20785
[21] Appl. No. 845,447
[22] Filed July 28, 1969
[45] Patented Mar. 30, 1971

[54] THROTTLING AND SHUT-OFF VALVE
  1 Claim, 2 Drawing Figs.
[52] U.S. Cl. .................................................. 251/121
[51] Int. Cl. ................................................. F16k 47/08
[50] Field of Search......................................... 251/121,
  124, 120, 359, 210, 122; 137/614.21, 329.01;
  138/46

[56] References Cited
  UNITED STATES PATENTS
  832,952  10/1906  Brooke.......................... 251/210X 1,061,556  5/1913  Osborne........................ 251/210X
3,080,144  3/1963  Baker............................ 251/121

Primary Examiner—M. Cary Nelson
Assistant Examiner—R. B. Rothman
Attorneys—L. A. Miller, Q. E. Hodges and A. Sopp ABSTRACT: A valve arrangement for controlling the flow of fluids which contains a valve disc positioned in a valve disc housing, said disc being shaped in an hourglass design so as to provide a first set of seats for effecting shutoff control of said fluids and a second set of seats for effecting throttling control and means for moving the two sets of seats into and out of positions in said housing. The shape of the valve disc also enhances the ease of operation of the valve.

INVENTOR.
EDWARD C. CLARK.
BY
ATTORNEY

THROTTLING AND SHUT-OFF VALVE

The invention described herein may be manufactured and used by or for the Government of the United States of America for governmental purposes without the payment of any royalties thereon or therefor.

BACKGROUND OF THE INVENTION

The present invention relates to a modified globe valve. Globe valves of the conventional design are frequently used for throttling or flow control of fluids. Such valves are satisfactory for mild forms of flow control but when used on more severe flow control the useful life of a conventional globe valve is limited. Flow control is of such a nature that it causes high velocities across the seats of a conventional globe valve and will soon cause wire-drawing and erosion, thus destroying the shutoff capability of the valve. If the seats of a conventional globe valve are eroded or wire-drawn to such an extent that the valve cannot be shut off, then the leakage through the valve will cause more erosion of the seats until the seating surface is completely destroyed.

When conventional globe valves are used on steam services such as drips, drains, continuous blowdown, warmup, and flow control, they often fail in the manner outlined above. For this reason it is common practice to use automatic devices such as traps which operate on a number of principles. Traps and similar devices are subject to malfunctioning, failure of their automatic sensing features, and have a limited capacity. The limited capacity of traps often permits flooding of the system during maximum steam consuming operations or permits steam to blow by when operating under minimum steam consumption.

SUMMARY

The instant invention overcomes the aforementioned problems and disadvantages of the prior art by providing a modified globe valve wherein a uniquely shaped valve disc is provided having a first set of seats for shutoff control and a second set of seats for throttling control. When it is desirable to stop the high velocity flow of fluid through the valve, the valve disc is moved so that the first set of seats is placed in a shutoff position. When it is desirable to produce a regulated high velocity flow of fluid through the valve, the valve disc is moved so that the second set of seats is placed in a throttling position. By moving the second set of seats into the throttling position, the first set of seats is displaced out of main flow and therefore is subjected to a greatly reduced eroding force from the high velocity flow.

The throttling and shutoff valve of the instant invention accomplishes nearly trouble free control of the flow of fluids under the most severe conditions with a minimum possibility of malfunctioning. The invention is well adapted to services that cause high velocities across valve seats such as drips, drain, continuous blowdown, flow control, warmup operations, etc.

Operation of the valve through a wide range of capacity makes such a valve ideal for warmup operations permitting large quantities of flow during the warmup period and reducing the flow to normal consumption of steam when the valve is used as a continuous drain. Thus its ability to operate under high flow conditions and be readily adjusted to severe throttling conditions is unique and can be accomplished without danger of malfunctioning.

Accordingly it is an object of the present invention to provide a throttling and shutoff valve which produces a shutoff effect by a first set of seats and a throttling effect by a second set of seats.

Another object is to provide a valve assembly which contains a uniquely designed valve disc the shape of which allows for easier operation.

Other objects and many of the attendant advantages of this invention will be readily appreciated as the same becomes better understood by reference to the following detailed description when considered in connection with the accompanying drawings wherein:

DESCRIPTION OF THE PREFERRED EMBODIMENT

Figure 1:
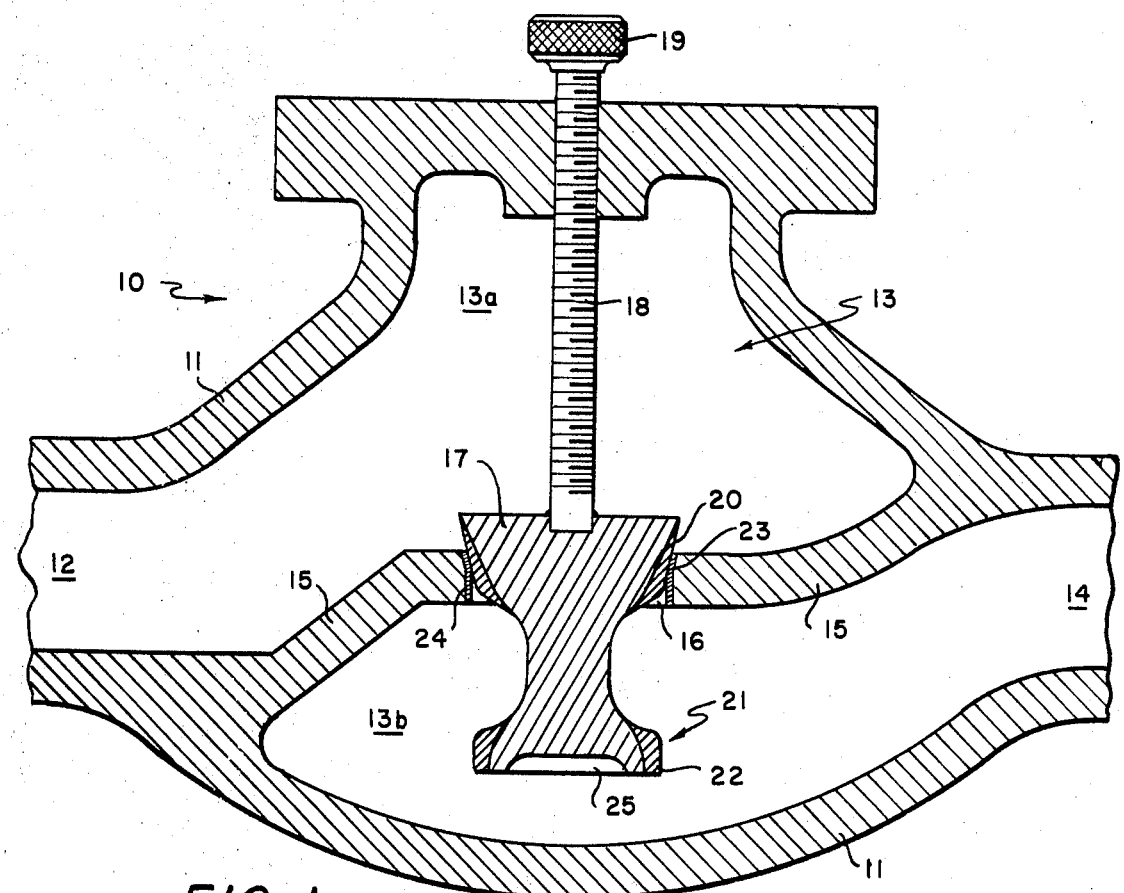
FIG. 1 illustrates the valve assembly with the valve disc in a shutoff position.

In FIG. 1 reference numeral 10 designates the complete valve arrangement. The assembly 10 includes a hollow body 11 having one or more inlet ports 12, an internal chamber 13, and an outlet port 14 leading from said chamber.

A valve housing or wall 15 is positioned in the body 11 between the inlet port 12 and the outlet port 14 and thereby separates chamber 13 into two smaller chambers 13a and 13b. Said valve housing contains a cylindrical bore 16 through which a valve disc 17 passes. Said valve disc moves through bore 16 so that it engages or disengages the valve housing 15 and thereby controls communication between chambers 13a and 13b.

The valve disc 17 is connected to a stem 18 which extends up through chamber 13a and body 11. Fastened to the stem 18 at the end position which passes through body 11 is a handle 19. Stem 18 is mounted in body 11 in such a manner that it may be moved along its central axis. As illustrated in FIG. 1, stem 18 is threadably engaging body 11 whereby rotation of handle 19 will cause axial movement of the stem. It is noted that the manner by which the stem is mounted in the body to provide for axial movement is a matter of choice and does not in any way constitute the patentably significant subject matter of the invention.

Valve disc 17 is shaped in a frustoconical design which closely resembles a hourglass containing two circular bases having different diameters and inwardly sloping side walls protruding from said bases. The first circular base which serves as the surface upon which stem 18 is connected to the valve disc has an outside diameter which is greater than the inside diameter of bore 16, while the second circular base has an outside diameter which is less than the inside diameter of bore 16.

Valve disc 17 also contains along a portion of its side wall upper seat 20 and lower seat 21. Upper seat 20 is positioned adjacent the first base and extends along a first portion of the sidewall while lower seat 21 is positioned adjacent the second base and extends along a second portion of said sidewall. Lower seat 21 contains a subsection or waster seat 22 which wears away first when fluid fluid flows over its surface and thereby prolongs the useful life of seat 21.

Seat portions are also provided along the inside wall of bore 16. Seat portion 23 is sloped at an angle which is slightly different than the angle the valve disc upper seat 20 makes with the vertical while seat portion 24 is substantially parallel to the central axis of the valve disc.

Therefore, when valve disc 17 is moved through bore 16 in the direction so that the first base approaches the bore, seats 20 and 23 are brought together until finally they engage one another and form a fluid tight seal. When valve disc 17 is moved so that the second base is partially within said bore, a gap is formed between seats 21 and 23 or 24 because of the reduced diameter of said disc at said second base. It is through said gap that fluid flows from chambers 13a to 13b and throttling control is effected. Accordingly, the fluid flow is regulated by increasing or decreasing the size of said gap by moving said disc. If desired, the entire valve disc can be moved up and out of said bore, thereby creating a condition of maximum fluid flow.

Valve disc 17 also contains a dished-out section 25 in the second base which minimizes the possibility of interference from foreign matter flowing through outlet port 14.

DESCRIPTION OF THE OPERATION

FIG. 1 depicts the invention in the shutoff mode of operation. This occurs when valve disc 17 is so positioned in bore 16 that upper seat 20 and seat portion 23 are in intimate contact, thereby forming a fluid tight seal between chambers 13a and 13b.

Figure 2:
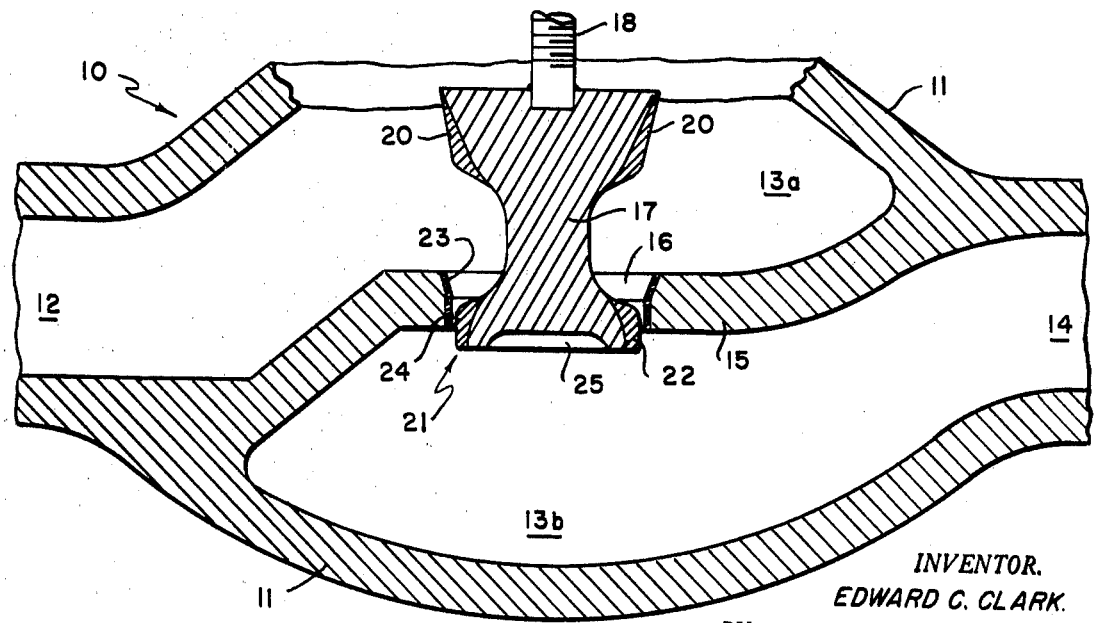
FIG. 2 illustrates the valve assembly with the valve disc in a throttling position.

FIG. 2 illustrates the invention in a throttling or flow control mode of operation. This occurs when handle 19 is rotated so as to retract stem 18 up through body 11 and thereby move valve disc 17 to a point where lower seat 21 is adjacent seat portion 24. Since the diameter of the valve disc at the second base is smaller than the diameter of the bore, lower seat 21 and seat portion 24 can never contact each other. Therefore when the valve disc is positioned as shown in FIG. 2, minimum flow or maximum throttling occurs and lower seat 21 and seat portion 24 are subjected to a maximum eroding or wire-drawing condition whereby waster seat 22 is consumed in part. However, such wear on lower seat 21 and seat portion 24 will have no appreciable effect on the ability of these seats to control the minimum flow through the valve. In addition, since a portion of lower seat 21 is substantially parallel to seat portion 24 in bore 16, the waster seat 22 and seat portion 24 will in effect be replaced by raising valve disc 17 to a higher position with relation to valve housing 15.

Thus, by moving the valve disc between the shutoff and maximum throttling positions the flow of fluids out of port 14 can be effectively regulated. An advantage of the invention's novel design is that the valve produces its throttling effect by one set of seats and its shutoff effect by a second set of seats. Therefore, when the valve is operating in the throttling mode, the shutoff seats are subjected to a minimum deterioration force. Consequently, the useful lives of the shutoff seats are greatly increased and the valve can be maintained for a maximum number of operations.

In addition, the hourglass design of the valve disc tends to cause a balance of the forces necessary to move the disc when the valve is other than shutoff. Thus the valve becomes easy to operate.

Although the primary purpose of the shutoff seats is to close the valve and stop the flow of fluid through output port 14, under abnormal conditions the fluid flow can be controlled by the shutoff seats in which case the minimum flow can be less than that produced by the throttling seats.

Obviously many modifications and variations of the present invention are possible in the light of the teachings thereof.

I claim:

1. A throttling and shutoff valve comprising:

a hollow body having a fluid inlet port and a fluid outlet port;

a wall positioned in said body separating the inlet port from the outlet port;

said wall containing a cylindrical bore;

an hourglass shaped valve disc containing a first circular base having an outside diameter greater than the inside diameter of said bore and a second circular base having an outside diameter less than the inside diameter of said bore;

said valve disc containing a first sidewall seat adjacent said first base for shutoff and a second sidewall seat adjacent said second base for throttling control, said second sidewall seat containing a waster section;

said bore furthermore containing a seat along its inside surface having a first portion sloped at an angle which is slightly different than the angle said valve disc first sidewall seat makes with the axis of said bore and a second portion substantially parallel to the axis of said bore; and means connected to said valve disc at one of said bases for moving said disc through said bore between a first position where said first seat contacts said bore for effecting shutoff control and a second position where said second seat is at least partially within the confines of said bore for effecting throttling control.